(12) United States Patent
Anson et al.

(10) Patent No.: US 8,464,633 B2
(45) Date of Patent: Jun. 18, 2013

(54) WATER CONTAINER CAP FOR HOLDING ADDITIVES TO WATER

(75) Inventors: Ricky L. Anson, Boise, ID (US); Rebecca Anson, Boise, ID (US)

(73) Assignee: Nutra-Life, Inc., Boise, ID (US)

( * ) Notice: Subject to any disclaimer, the term of this patent is extended or adjusted under 35 U.S.C. 154(b) by 0 days.

(21) Appl. No.: 13/440,854

(22) Filed: Apr. 5, 2012

(65) Prior Publication Data
US 2012/0261283 A1 Oct. 18, 2012

Related U.S. Application Data

(63) Continuation of application No. 12/427,617, filed on Apr. 21, 2009, now Pat. No. 8,230,777, which is a continuation-in-part of application No. 12/176,777, filed on Jul. 21, 2008, now abandoned.

(51) Int. Cl.
*B65D 25/08* (2006.01)
*A47J 31/00* (2006.01)

(52) U.S. Cl.
USPC .............. 99/323; 99/322; 206/5; 206/219; 215/DIG. 8; 426/115

(58) Field of Classification Search
USPC ............. 99/323, 322, 295; 206/219, 220, 206/0.5; 215/6, DIG. 8; 220/501, 212, 705; 426/112, 115, 519, 590
See application file for complete search history.

(56) References Cited

U.S. PATENT DOCUMENTS

| 4,638,927 A | 1/1987 | Morane |
| 4,805,799 A | 2/1989 | Robbins, III |
| 5,921,955 A * | 7/1999 | Mazer et al. ................ 604/83 |
| 5,984,141 A | 11/1999 | Gibler |
| 6,164,495 A | 12/2000 | Manesis |
| 6,170,654 B1 | 1/2001 | Gartner et al. |
| 6,527,110 B2 | 3/2003 | Moscovitz |
| 6,533,113 B2 | 3/2003 | Moscovitz |
| 6,540,070 B1 | 4/2003 | Conwell |
| 6,681,958 B2 | 1/2004 | Sorenson et al. |
| 6,705,490 B1 | 3/2004 | Lizerbram et al. |
| 6,926,138 B1 | 8/2005 | Basham et al. |
| 6,945,393 B2 * | 9/2005 | Cho ........................ 206/219 |
| 6,959,839 B2 | 11/2005 | Roth et al. |
| 7,017,735 B2 | 3/2006 | Carlson |

(Continued)

FOREIGN PATENT DOCUMENTS

| JP | 1254576 | 11/1989 |
| JP | 2007062768 | 3/2007 |

(Continued)

*Primary Examiner* — Reginald L Alexander
(74) *Attorney, Agent, or Firm* — Davis Wright Tremaine LLP; George C. Rondeau, Jr.

(57) ABSTRACT

A supplement dispensing closure couplable to an outlet of a container, such as a water container. When the closure is coupled to the container, liquid exiting the container through the outlet flows through a supplement retention area that retains a dissolvable supplement body inside the closure as the liquid flows therethrough and dissolves the dissolvable supplement body. A user may select one or more dissolvable supplement bodies and insert them inside the supplement retention area for dissolution in the liquid as it flows through the supplement retention area. The closure may include a selectively openable and closable cap portion. Optionally, the closure includes a filter configured to filter one or more components from the liquid before or after it flows through the supplement retention area.

17 Claims, 7 Drawing Sheets

U.S. PATENT DOCUMENTS

| | | |
|---|---|---|
| 7,055,685 B1 | 6/2006 | Patterson et al. |
| 7,150,829 B2 | 12/2006 | Na et al. |
| 7,249,690 B2 | 7/2007 | Smith et al. |
| 7,306,117 B2 | 12/2007 | Roth et al. |
| 7,308,915 B2 | 12/2007 | Johns et al. |
| 2000/2018995 | 12/2002 | Schoo |
| 2003/0213709 A1 | 11/2003 | Gibler et al. |
| 2004/0007481 A1 | 1/2004 | Kiser, Jr. |
| 2004/0026270 A1 | 2/2004 | Liang |
| 2004/0155061 A1 | 8/2004 | Roth et al. |
| 2005/0127101 A1 | 6/2005 | Roth et al. |
| 2008/0067120 A1 | 3/2008 | Chatrath |
| 2008/0116086 A1* | 5/2008 | Hung .................. 206/222 |
| 2009/0223921 A1 | 9/2009 | Enghard |
| 2011/0006071 A1 | 1/2011 | Koumans |

FOREIGN PATENT DOCUMENTS

| | | |
|---|---|---|
| JP | 2000226050 | 8/2008 |
| WO | 9815187 | 4/1998 |
| WO | 2008023981 | 2/2008 |

* cited by examiner

WATER CONTAINER CAP FOR HOLDING ADDITIVES TO WATER

CROSS REFERENCE TO RELATED APPLICATION(S)

This application is a continuation of U.S. application Ser. No. 12/427,617 filed Apr. 21, 2009 which is a continuation-in-part of U.S. application Ser. No. 12/176,777, filed Jul. 21, 2008.

BACKGROUND OF THE INVENTION

1. Field of the Invention

The present invention is directed generally to a cap for use with a water container and, more specifically, to a container cap assembly in which an additive or supplement tablet may be placed for dissolution in water as it is poured from the container.

2. Description of the Related Art

It is often desirable to purchase water to which various additives have been added. These additives may include nutrients, minerals, vitamins, colorings, flavorings, medicinal materials, herbal remedies, chemicals, and the like. The additives are often supplied with the water itself (e.g., supplements may be dissolved or suspended in the water) and sold as water designed for a certain task. A disadvantage of water prepared with an additive (i.e., a pre-mixed water/supplement mixture) is that the container housing the water is typically disposable, and after being utilized, typically becomes waste. The pre-mixed water/supplement mixture may also have to be transported for a long distance, which adds greatly to the cost of the product. Further, many nutrients lose their effectiveness after being immersed in water for a period of time.

A need exists for a method for preparing supplemented liquids that avoids pre-mixing the supplement in the liquid. A need also exists for a device for conveniently preparing supplementing liquids at the point of consumption. It would be desirable for the device to introduce the supplement into only a portion of liquid poured from a container for consumption. The present application provides these and other advantages as will be apparent from the following detailed description and accompanying figures.

SUMMARY OF THE INVENTION

The present disclosure provides a container cap assembly for attachment to a container. The cap assembly is configured to hold additives (or supplements) for addition to a liquid (e.g., water) stored in the container. The container cap assembly is configured to add the additives to the liquid as it passes (or is poured) out of the container.

The additives that may be added to the liquid in this manner include, for example, vitamins (such as multi-vitamins, vitamin C, vitamin D, vitamin A, B-complex, and the like) as well as minerals (such as Calcium, Strontium, Fluorine, Potassium, Sodium, and the like). In addition to vitamins and minerals, the additives may include colorings, flavorings, water purifiers, and other chemicals, which may be desirable to add to the liquid. These could include materials for aromatherapy, appetite suppressants, herbal mixtures, protein additives, antibiotics, nicotine, antioxidants, ginseng, caffeine, or other stimulants, and medicines. In addition to products for human consumption, products such as pesticides, herbicides, plant fertilizers, and other chemicals could be added to liquid poured from the container, for use in the home, garden, lawn, roadways, and on pets.

Each of these additives is configured as a solid supplement body that may be in a tablet, pellet, or pill form. The supplement body includes selected ingredients that cause the supplement body (e.g., tablet, pill, or pellet) to dissolve at a selected dissolve rate in the liquid being poured as it is being poured. The supplement body may be configured to dissolve at a dissolve rate selected for a volume of liquid (e.g., water) housed inside the container, so that when the container is emptied, the contents of the supplement body are fully dissolved and have been dispensed with the liquid exiting the container.

The supplement body can also be configured to dissolve more slowly (i.e., to have a slower dissolve rate) thus having a greater dispensing time. Such a supplement body may be used for several or many refillings of the liquid in the container.

The container cap assembly includes a cap body (or supplement housing portion) which further includes a connector portion or fitting for attaching the cap body to the container. Various embodiments of the container cap assembly include a closure valve for opening and closing a passage for the release of liquid from the container.

The container cap assembly include a supplement retention area for retaining a dissolving supplement body as the liquid poured from the container. The supplement retention area may include a tablet basket configured to receive a tablet composed of a substance desirable to add to the liquid in the container. When the liquid is dispensed from the container, the liquid passes through the tablet basket, and gradually dissolves the tablet in the outflow of liquid. Alternatively the supplement retention area may include one or more supplement chambers, each configured for use with one or more supplement bodies of the same or different type.

The container cap assembly can be designed to be disposable so that after the selected supplement body (e.g., tablet) in the supplement retention area has dissolved, the container cap assembly is replaced with a new container cap assembly housing a different supplement body. Alternatively, the container cap assembly can also be configured to be reusable so that a new supplement body can be placed in the supplement retention area (e.g., in the tablet basket). For example, the supplement body may be replaced after a previously selected supplement body has dissolved, periodically, or whenever the user chooses to refill the container cap assembly. In order to refill the container cap assembly, an opening or capsule access port is provided for inserting a supplement body into the supplement retention area of the cap body. The container cap is also removable from and reattachable to the container at least when the container cap assembly is configured to be reusable so more liquid can be added to refill the container.

The supplement body may be made up of a mixture of ingredients, which may include vitamins, minerals, medicinal herbs, water purifiers, antibiotics, colorings, flavorings, or other additives which may be desirable to add to domestic tap and non-potable water.

In particular embodiments, the cap body may be divided into two parts, with one part being a cap base and another part being a cap top. The cap top and the cap base are joined to one another at a connection interface. The cap base includes a container fitting interface that is attachable to a selected container.

Water containers with which the container cap assembly may be utilized include individual-sized drinking water containers, such as plastic bottles containing a quart, a half liter, or a liter of water. Examples of other types of water containers that may be used with the container cap assembly include insulated jugs such as a picnic-sized water containers, and industrial-sized containers such as 5 gallon or 10 gallon water containers. For each of these, a container cap assembly may be configured to fit on the water dispensing spout of the container. Further, a particular supplement body to be used with the container may be configured for use with a maximum volume of liquid storable in the container and/or a time release period of the additive.

Other water containers that may be used with the container cap assembly include a flexible bladder containing water, which can be sized from a personal size (such as one liter) to a larger size (such as three liters) to an even larger size (such as those used in military and disaster recovery situations), which may contain many thousands of gallons of water. The container cap assembly may also be fitted to other types of water containers, such as truck mounted water containers carried on the bed of a truck, which may hold several to many thousands of gallons of water.

The interface between the cap base and the container may be implemented as a threaded connection; however, other implementations are also possible, such as a permanent attachment, a half rotation type connection, or other conventional cap attachment means. The interface between the cap base and the cap top may be implemented as a threaded connection; however, other types of implementations would also work, such as a snap-on connection, or a connection that releases by a partial rotation of the cap top relative to the cap base, a partial rotation of the cap base relative to the cap top, or a combination thereof.

The cap top may include a basket closure that presses down against the top of the tablet basket, to trap a tablet in the tablet basket. The basket closure may be perforated with a number of holes that allow the liquid to flow out of the container after it has passed through the tablet basket. Alternatively, the container cap assembly may include a cap portion coupled to the supplement housing portion over the opening(s) through which the supplement bodies are received into the supplement chamber(s). The cap portion includes an internal stop portion that retains the supplement bodies in the supplement retention area and prevents them from exiting the supplement chamber(s) through the opening(s).

The closure valve can take a number of configurations, including having a pull-out central stem which opens a passage for the liquid to flow out of the container. Other conventional closures for a container are also possible, including a bite valve, a screw-on bottle top, a pull-out release, and other configurations of container caps.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing embodiments of the invention, simply by way of illustration of the best mode currently contemplated for carrying out the invention. As will be realized, the invention is capable of modification in various respects all without departing from the invention. Accordingly, the drawings and description of the embodiments are to be regarded as illustrative in nature, and not as restrictive in nature.

BRIEF DESCRIPTION OF THE SEVERAL VIEWS OF THE DRAWING(S)

DETAILED DESCRIPTION OF THE INVENTION

Figure 1:
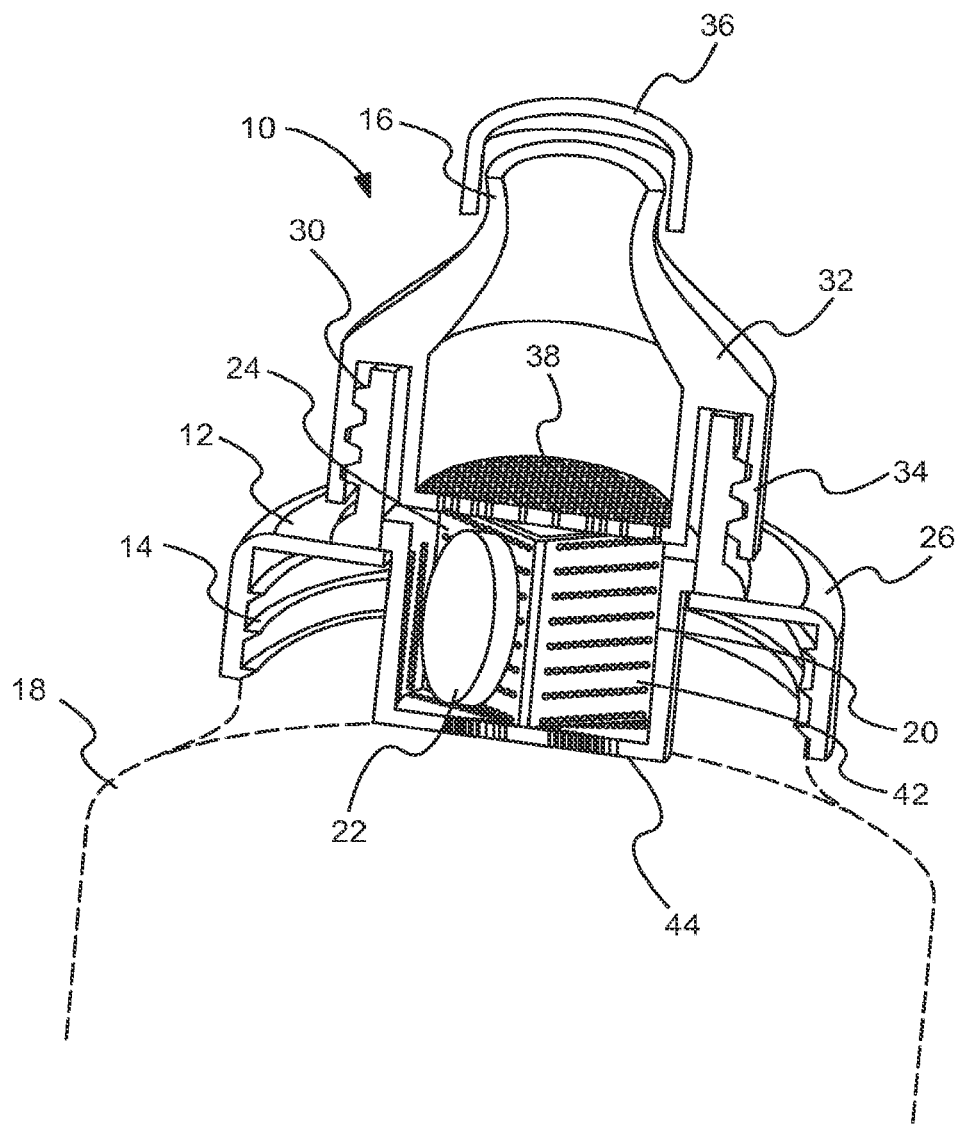
FIG. 1 is a cut-away perspective view of the container cap assembly of the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but, on the contrary, the invention is to cover all modifications, alternative constructions, and equivalents falling within the spirit and scope of the invention as defined by the claims In the following description and in the figures, like elements are identified with like reference numerals. The use of "or" indicates a non-exclusive alternative without limitation unless otherwise noted. The use of "including" means "including, but not limited to," unless otherwise noted.

FIG. 1 shows a first embodiment of the invention. This embodiment shows a container cap assembly 10 attached to a container 18. The container cap assembly 10 includes a cap body 12 made up of a cap base 26 and a cap top 32. The cap base 26 includes a connection 30 to the cap top 32 and a container fitting interface 14. The cap base 26 also includes a tablet basket 20 holding a tablet 22. Inside the tablet basket 20 are dividers 42 in which different tablets 22 may be placed. The cap top 32 includes a connection 34 to the cap base 26, a closure cap 36, and a basket closure 38. The basket closure 38 is a disc like surface with a number of perforations. When screwed together, the basket closure 38 seals off the tablet basket 20 and allows water to flow through the container cap assembly 10 but keeps the tablet 22 from leaving the container cap assembly. The tablet basket 20 includes perforations 44 for allowing water within the container 18 to flow out the container cap assembly 10.

Although shown as a two-piece unit, with the tablet basket 20 being openable for refilling, the container cap assembly 10 can also be configured as a one-piece unit, supplied with one or more tablets 22, without the ability for refilling. The version shown in FIG. 1 has a tablet access port 24 which is exposed when the cap top 32 is removed from the cap base 26.

The closure cap 36 can also take a number of forms, including a pull-up closure valve 16 or other conventional water container closure mechanisms. These can include a handle which twists to open the passage for water to exit the cap top 32 or other conventional water container dispensing enclosure caps and valves.

Figure 2:
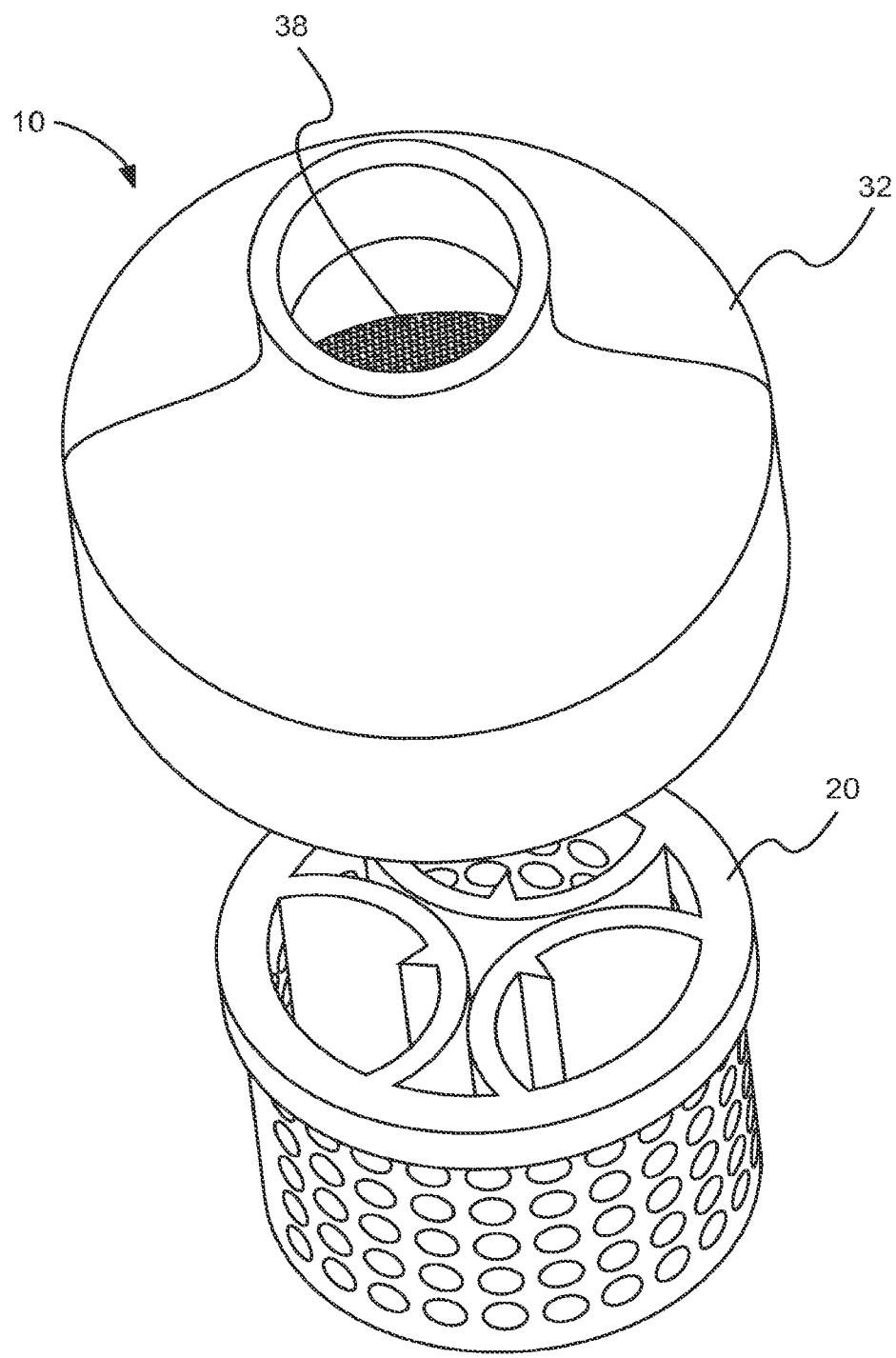
FIG. 2 is a perspective view of the container cap top and tablet basket.

Shown in FIG. 2 is a perspective view of the cap top 32 and the tablet basket 20. Viewable through the top opening of the cap top 32 is the perforated basket closure 38 portion of the cap top, which prevents the tablets 22 (see FIG. 1) from exiting the tablet basket 20.

Alternate Embodiment

Figure 3:
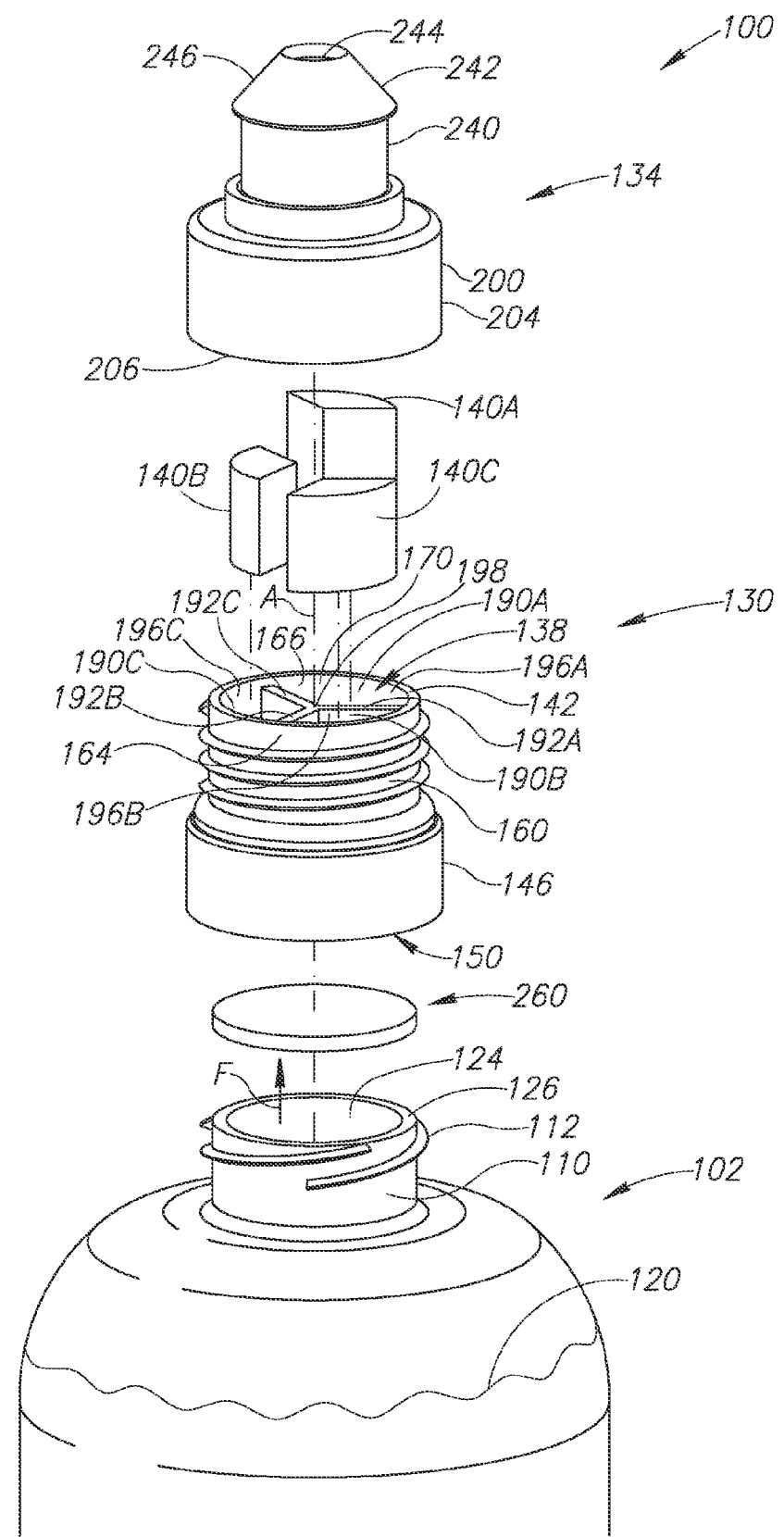
FIG. 3 is an exploded perspective view of an embodiment of a supplement dispensing closure for use with a container housing a liquid.

FIG. 3 illustrates a second embodiment of a supplement dispensing cap or closure 100 for use with a container 102 (such as a water bottle). The container 102 may be implemented as any conventional beverage container known in the art, including as a blow molded bottle or a larger liquid container. In the embodiment illustrated, the container 102 has a threaded neck portion 110 with outside threads 112 disposed thereabout. The container 102 houses or stores a liquid 120. The liquid 120 may be any beverage including commercially available beverages such as bottled water, GATORADE®, KOOL-AID®, and the like or simply tap water. By way of non-limiting examples, the liquid 120 may include water, soda, fruit juice, vegetable juice, dairy products, and combinations thereof. The liquid 120 stored in the container 102 exits therefrom through an outlet 124. In the embodiment illustrated, the outlet 124 is formed in an open distal portion 126 of the threaded neck portion 110 of the container 102.

The closure 100 includes a supplement housing portion 130 and a cap portion 134 that together define a supplement retention area 138 in which one or more dissolvable supplement bodies (e.g., dissolvable supplement bodies 140A, 140B, and 140C) are retained as the liquid 120 is poured from the container 102 through the outlet 124 and into the supplement housing portion 130 along a flow direction indentified by a single headed arrow "F." The dissolvable supplement bodies 140A, 140B, and 140C are dissolved by the liquid 120 as it flows through the supplement retention area 138. A flow rate of the liquid 120 through the supplement retention area 138 may be based at least in part on a dissolve rate of the one or more dissolvable supplement bodies 140A, 140B, and 140C in the liquid 120 as it flows through the supplement retention area 138 at the flow rate.

The dissolved portions of the dissolvable supplement bodies 140A, 140B, and 140C combine with the liquid 120 to form a supplemented liquid to be consumed by a user, typically as it exits the closure 100. The dissolvable supplement bodies 140A, 140B, and 140C may include one or more nutrients, minerals, vitamins, dietary supplements, sleep aids, weight loss products, energy enhancers, wellness products, colorings, flavorings, medicinal materials, herbal remedies, chemicals, combinations thereof, and the like. The dissolvable supplement bodies 140A, 140B, and 140C may be selected to produce a particular supplemented liquid. By way of non-limiting examples, the dissolvable supplement bodies 140A, 140B, and 140C may be selected to produce an energy drink, a sports drink, a wellness drink, a protein drink, a weight loss drink, a multivitamin drink, an appetite suppressing drink, a sleep aid, and the like, or a combined purpose drink. In other words, depending upon the supplement bodies 140A, 140B, and 140C selected, the same liquid 120 may be transformed into any one of a number of possible supplemented liquids. When the liquid 120 includes an adequate portion of water, the supplemented liquid may retain its hydrating properties while delivering dissolved supplements to the user.

The supplement housing portion 130 has an outer sidewall 142 that may be generally symmetric about a central axis "A." For example, the outer sidewall 142 may have a generally cylindrical shape with a circular cross-sectional shape. In the embodiment illustrated, the central axis "A" is substantially parallel to the flow direction (indentified by arrow "F") and the supplement housing portion 130 is elongated along the central axis "A." However, these are not requirements. Further, the outer sidewall 142 need not be symmetric about the central axis "A." For example, implementations in which the outer sidewall 142 defines a supplement housing portion having a curved or bent shape are within the scope of the present disclosure.

Figure 4:
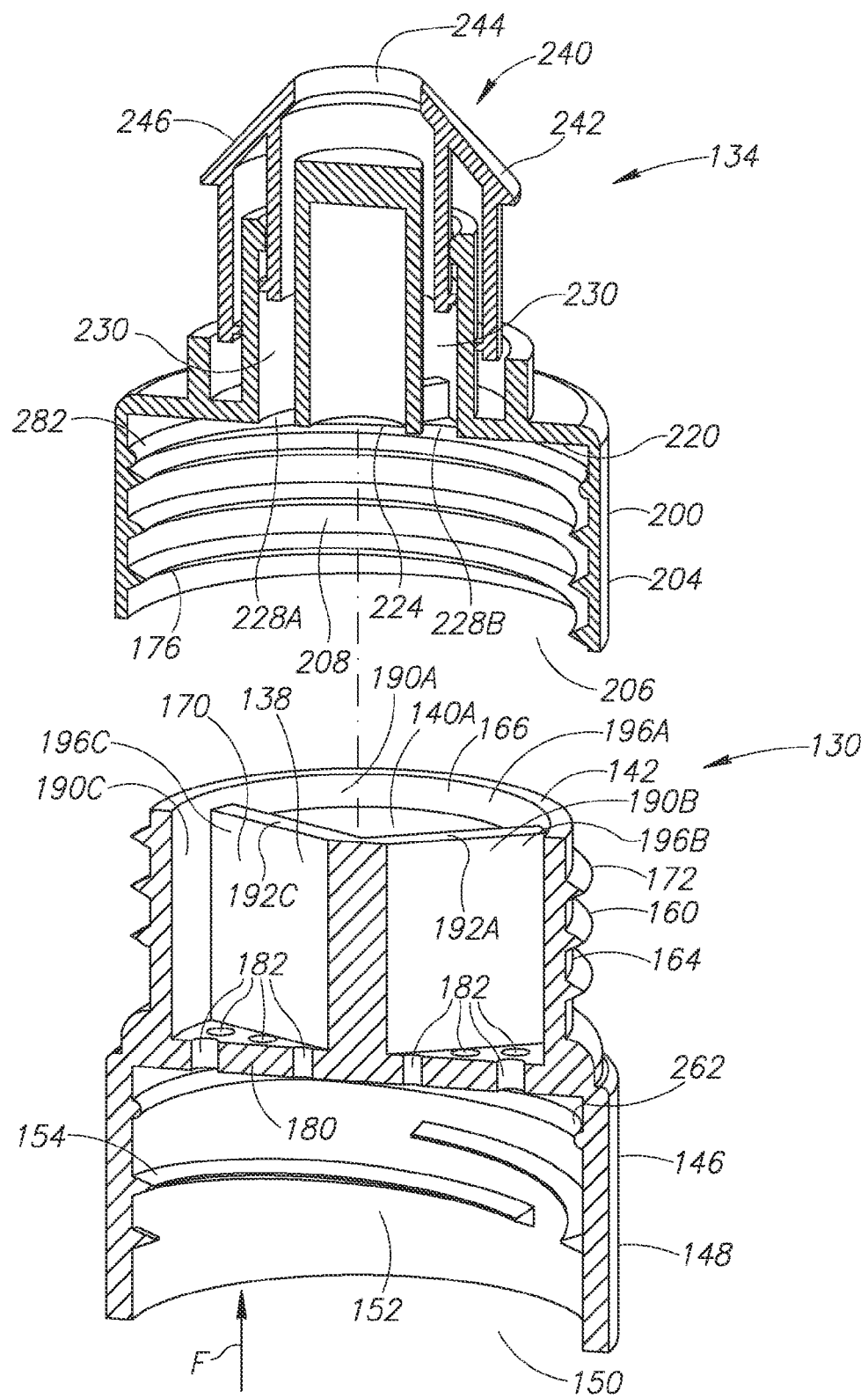
FIG. 4 is an exploded cross-sectional view of a supplement housing portion and a cap portion of the supplement dispensing closure of FIG. 3.

The supplement housing portion 130 has a first connector portion 146 couplable to the outlet 124 of the container 102. In the embodiment illustrated, the outlet 124 is formed in the open distal portion 126 of the threaded neck portion 110 of the container 102. Turning to FIG. 4, the first connector portion 146 is formed in a lower portion 148 of the outer sidewall 142, which defines an open lower portion 150 in communication with a hollow interior portion 152. The open lower portion 150 is configured to allow the threaded neck portion 110 (see FIG. 3) of the container 102 (see FIG. 3) to pass therethrough into the hollow interior portion 152 of the first connector portion 146. In this manner, the outlet 124 (see FIG. 3) of the container 102 (see FIG. 3) is received inside the hollow interior portion 152 to allow the liquid 120 (see FIG. 3) to be poured from the container through the outlet into the supplement housing portion.

In the embodiment illustrated, the first connector portion 146 includes inside threads 154 disposed on the inside of the lower portion 148 of the outer sidewall 142 configured to threadably engage the outside threads 112 (illustrated in FIG. 3) of the threaded neck portion 110 (see FIG. 3) of the container 102 (see FIG. 3) to removably secure the closure 100 to the container in a fluid tight manner.

The supplement housing portion 130 has a second connector portion 160 couplable to the cap portion 134. The second connector portion 160 is formed in an upper portion 164 of the outer sidewall 142, which defines an open upper portion 166 in communication with a hollow interior portion 170 of the supplement housing portion 130. In the embodiment illustrated, the second connector portion 160 has outside threads 172 disposed on the outside of the upper portion 164 of the outer sidewall 142 configured to threadably engage inside threads 176 disposed inside the cap portion 134 to removably secure the cap portions to the supplement housing portion 130.

When the cap portion 134 is coupled to the second connector portion 160 of the supplement housing portion 130, the supplement retention area 138 is defined between the cap portion 134, the inside of the outer sidewall 142, and a perforated supplement support platform 180 located between the open upper portion 166 and the open lower portion 150. The perforated supplement support platform 180 may be transverse to the flow direction (identified by the arrow "F"). In the embodiment illustrated, the perforated supplement support platform 180 is located between the first and second connector portions 146 and 160. However, this is not a requirement and embodiments in which the perforated supplement support platform 180 is located within either of the first and second connector portions 146 and 160 are within the scope of the present teachings.

As is appreciated by those of ordinary skill in the art, an extended plug type seal (not shown) typically includes continuous ring-shaped projection that extends away from a support surface, such the inside upper surface of a cap. Optionally, an extended plug type seal (not shown) may extend from the perforated supplement support platform 180 toward the open lower portion 150. When the first connector portion 146 of the supplement housing portion 130 is coupled to the outlet 124 (see FIG. 3) of the container 102 (see FIG. 3), the outlet 124 is received inside the hollow interior portion 152 of the first connector portion 146, and the extended plug type seal (not shown) extends into the open distal portion 126 of the outlet 124 to form a liquid tight seal between the supplement housing portion 130 and the outlet 124.

The dissolvable supplement bodies 140A, 140B, and 140C (see FIG. 3) may be inserted into the supplement retention area 138 via the open upper portion 166 when the cap portion 134 is removed from the supplement housing portion 130. FIG. 4 illustrates one of the dissolvable supplement bodies 140A housed or nested inside the supplement retention area 138. The perforated supplement support platform 180 includes perforations 182 that allow the liquid 120 (see FIG. 3) in the hollow interior portion 152 of the first connector portion 146 received from the outlet 124 (see FIG. 3) of the container 102 (see FIG. 3) to flow into the supplement retention area 138 when the container 102 is sufficiently tipped. Additionally, the perforations 182 allow the liquid remaining in the closure 100 to flow back into the container 102 when placed in an upright position. Optionally, the perforated supplement support platform 180 may be coated with a coating (not shown) configured to filter one or more components from the liquid 120 (see FIG. 3) before it enters the supplement retention area 138.

The liquid 120 (see FIG. 3) flowing through the perforations 182 into the supplement retention area 138 flows passed the dissolvable supplement bodies 140A, 140B, and 140C (see FIG. 3) at least partially dissolving them at the dissolve rate to form the supplemented liquid, which exits the supplement retention area 138 through the open upper portion 166. If the cap portion 134 is coupled to the second connector portion 160 of the supplement housing portion 130, the supplemented liquid exiting the open upper portion 166 enters the cap portion 134.

In the embodiment illustrated, the supplement retention area 138 is disposed inside the hollow interior portion 170 of the second connector portion 160; thus, the outside threads 172 extend along the outside of the upper portion 164 of the outer sidewall 142, which is adjacent to the supplement retention area 138. However, this is not a requirement.

As best seen in FIG. 3, optionally, the supplement retention area 138 may be divided into a plurality of supplement chambers (e.g., supplement chambers 190A, 190B, and 190C) by one or more dividing walls (e.g., dividing walls 192A, 192B, and 192C). In the embodiment illustrated, the supplement housing portion 130 includes three supplement chambers 190A, 190B, and 190C separated from one another by dividing walls 192A, 192B, and 192C. The dividing wall 192A separates adjacent supplement chambers 190A, and 190B from one another. The dividing wall 192B separates adjacent supplement chambers 190B, and 190C from one another. The dividing wall 192C separates adjacent supplement chambers 190A, and 190C from one another.

The dividing walls 192A, 192B, and 192C are illustrated as extending upwardly from the perforated supplement support platform 180 (see FIG. 4) toward the open upper portion 166 along the flow direction (identified by arrow "F"). In such embodiments, the open upper portion 166 of the supplement retention area 138 is divided into open-end portions 196A, 196B, and 196C by the dividing walls 192A, 192B, and 192C. Thus, each of the supplement chambers 190A, 190B, and 190C has an open-end portion 196A, 196B, and 196C, respectively, configured to allow the dissolvable supplement bodies 140A, 140B, and 140C, respectively, to be inserted into the supplement chambers 190A, 190B, and 190C, respectively.

Each of the dividing walls 192A, 192B, and 192C is illustrated as extending from a portion of the inside of the upper portion 164 of the outer sidewall 142 toward a central portion 198 of the hollow interior portion 170 and meeting at the central portion. Thus, in the embodiment illustrated, the three dividing walls 192A, 192B, and 192C are attached together at the central portion 198. In embodiments in which the outer sidewall 142 is generally symmetric about the central axis "A," the central portion 198 is located along the central axis "A."

The cap portion 134 may be implemented as any selectively openable and closable cap known in the art. In the embodiment illustrated, the cap portion 134 has been implemented as a standard (push-pull type) sports cap. By way of a non-limiting example, the cap portion 134 may be implemented as a standard 28 mm sports type closure, a standard 26 mm sports type closure, or any other sports type closure. However, other types of caps or cap portions may be used. By way of other non-limiting examples, the cap portion 134 may be implemented as a cap having a hinged lid, a twist cap that opens by twisting a twistable portion of a valve assembly, a "Sippy" top (i.e., a cap configured to be similar to a spill proof top found on a toddler's sip cup), and the like.

A twist-open sports cap, A cap that has a spring loaded Lid, etc.) The cap portion 134 has a cap connector portion 200 couplable to the second connector portion 160 of the supplement housing portion 130. Turning to FIG. 4, the cap connector portion 200 includes a lower outer sidewall 204, which defines an open lower portion 206 in communication with a hollow interior portion 208. The lower outer sidewall 204 illustrated has a generally cylindrically shape having a circular cross-sectional shape. The open lower portion 206 is configured to allow the open upper portion 166 of the second connector portion 160 of the supplement housing portion 130 to pass therethrough into the hollow interior portion 208 of the cap connector portion 200. In this manner, the open upper portion 166 of the second connector portion 160 is received inside the hollow interior portion 208 of the cap connector portion 200 of the cap portion 134 to allow the liquid 120 to be poured from the supplement retention area 138 through the open upper portion 166 and into the cap portion 134.

As mentioned above, the cap portion 134 includes the inside threads 176 configured to engage the outside threads 172 of the second connector portion 160 disposed on the outside of the upper portion 164 of the outer sidewall 142 of the supplement housing portion 130. The inside threads 176 are disposed on the inside of the lower outer sidewall 204 of the cap connector portion 200. When the inside threads 176 of the cap portion 134 are mated with the outside threads 172 of the second connector portion 160 of the supplement housing portion 130, the open upper portion 166 of the second connector portion 160 (in fluid communication with the supplement retention area 138) is located inside the cap portion 134 allowing the liquid 120 (see FIG. 3) flowing from the open upper portion 166 of the second connector portion 160 (after having passed through the supplement retention area 138) to enter the cap portion 134.

As also mentioned above, the supplement housing portion 130 and the cap portion 134 together define the supplement retention area 138. The cap portion 134 includes an annular internal stop portion 220 disposed about a central portion 224 having one or more inlets 228A and 228B to a fluid flow channel 230.

When the cap portion 134 is coupled to the supplement housing portion 130, the annular internal stop portion 220 is adjacent the open upper portion 166 (and/or open-end portions 196A, 196B, and 196C depending upon the implementation details) of the second connector portion 160. Further, the inlets 228A and 228B are adjacent the central portion 198 (see FIG. 3) of the hollow interior portion 170 of the second connector portion 160 whereat the dividing walls 192A, 192B (see FIGS. 3), and 192C meet.

The internal stop portion 220 helps retain the supplement bodies 140A, 140B (see FIGS. 3), and 140C (see FIG. 3) inside the supplement retention area 138 when the supplement housing portion 130 and the cap portion 134 are tipped, or in the extreme, inverted, such as occurs when the container 102 (see FIG. 3) is tipped or inverted to pour the liquid 120 (see FIG. 3) out through the outlet 124 (see FIG. 3). The inlets 228A and 228B adjacent the central portion 198 (see FIG. 3) of the hollow interior portion 170 of the second connector portion 160 extend outwardly beyond the location of the intersection of the dividing walls 192A, 192B (illustrated in FIGS. 3), and 192C to allow the liquid 120 (see FIG. 3) exiting the supplement chambers 190A, 190B, and 190C via the open-end portions 196A, 196B, and 196C, respectively, to flow into the fluid flow channel 230.

Further, a gap (not shown) may be defined between the upper portion 164 of the outer sidewall 142 of the supplement housing portion 130 and the internal stop portion 220 of the cap portion 134. In such embodiments, the liquid 120 (see FIG. 3) exiting the supplement chambers 190A, 190B, and 190C via the open-end portions 196A, 196B, and 196C, respectively, may flow through the gap and into the inlets 228A and 228B of the fluid flow channel 230 of the cap portion 134.

The liquid 120 flows passed the internal stop portion 220 while at the same time, the supplement bodies 140A, 140B (see FIGS. 3), and 140C (see FIG. 3) dissolving in the passing liquid 120 are held within the supplement retention area 138 by the internal stop portion 220.

In the embodiment illustrated, the fluid flow channel 230 extends upwardly away from the internal stop portion 220 along the flow direction (identified by arrow "F") and is terminated by an optional valve assembly 240. The valve assembly 240 includes a slidable valve member 242 that is selectably transitional from an open position (illustrated in FIG. 4) to a closed position (not shown) and vice versa. When the slidable valve member 242 is in the open position, the liquid 120 (see FIG. 3) in the fluid flow channel 230 may exit the cap portion 134 through an exit aperture 244 in the valve assembly 240. On the other hand, when the slidable valve member 242 is in the closed position, the exit aperture 244 is closed and the liquid 120 (see FIG. 3) in the fluid flow channel 230 is retained inside the cap portion 134 by the valve assembly 240.

A distal portion 246 of the cap portion 134 may be configured to be received inside a user's mouth. In the embodiment illustrated, the valve assembly 240 is located at the distal portion 246 of the cap portion 134 and is receivable inside the mouth of the user. However, this is not a requirement.

While the fluid flow channel 230 has been illustrated as extending upwardly away from the internal stop portion 220 along the flow direction (identified by arrow "F"), those of ordinary skill in the appreciate that the fluid flow channel 230 may extend along a direction other than the flow direction (identified by arrow "F") toward the optional valve assembly 240 and such embodiments are within the scope of the present disclosure. Further, through application of ordinary skill to the present teachings, the location of the fluid flow channel 230 and/or its inlets 228A and 228B may be modified and such embodiments are within the scope of the present disclosure. Further, the number of fluid flow channels and/or inlets may be modified.

The size of the dissolvable supplement bodies 140A, 140B (see FIGS. 3), and 140C (see FIG. 3) may be determined at least in part by the size and shape of the supplement chambers 190A, 190B, and 190C, respectively. In the embodiment illustrated in FIG. 3, the supplement chambers 190A, 190B, and 190C each have generally pie or wedge shaped cross-sectional shape. Further, the shape and hence surface area of the dissolvable supplement bodies 140A, 140B, and 140C may be determined at least in part based on a desired dissolve rate. For example, a ratio of surface area to volume may be selected to achieve a desired dissolve rate. Because the solid yet dissolvable supplement bodies 140A, 140B, and 140C obstruct the flow of the liquid 120 through the supplement retention area 138, the supplement bodies may be configured to achieve at least a minimum desired flow rate or alternatively, at most a maximum desired flow rate. Thus, the shape of the dissolvable supplement bodies 140A, 140B, and 140C may be determined at least in part based on the desired flow rate of the liquid 120 through the supplement retention area 138. The dissolvable supplement bodies 140A, 140B, and 140C may have many shapes so long as providing the desired dissolve rate.

The closure 100 may include an optional filter 260 (see FIG. 3). The filter 260 may be receivable inside the open lower portion 150 of the first connector portion 146 of the supplement housing portion 130 and may optionally snap inside the hollow interior portion 152 (see FIG. 4). Turning to FIG. 4, the hollow interior portion 152 may include one or more optional filter retainer projection 262 extending inwardly from the inside surface of the lower portion 148 of the outer sidewall 142. The projection 262 is located between the perforated supplement support platform 180 and the inside threads 154. The filter 260 (see FIG. 3) may be pressed upwardly into the hollow interior portion 152 and forced upwardly passed the projection 262 to removably secure the filter 260 in place. Once located between the perforated supplement support platform 180 and the projection 262, the filter 260 is prevented from exiting the hollow interior portion 152 through the open lower portion 150 by the projection 262.

The filter 260 may include perforations (not shown). Alternatively, the filter 260 may be implemented as a charcoal filter, a foam or ceramic filter, a combination of these, and the like. Further, the filter 260 may be implemented as a screen or other type of filtering or screening device. For example, the filter 260 may be implemented as a charcoal water filter, a water distiller, a ceramic water filter, a reverse osmosis filter, an ultraviolet water filter, and the like. The filter 260 filters one or more components from the liquid 120 (see FIG. 3) before it enters the supplement retention area 138. By way of a non-limiting example, the filter 260 may be coated with a coating (not shown) configured to filter one or more components from the liquid 120 (see FIG. 3) before it enters the supplement retention area 138. The filter 260 may also prevent any small pieces of one of the dissolvable supplement bodies 140A, 140B, and 140C from passing through one of the perforations 182 of the supplement support platform 180 and entering the container 102.

Figure 5:
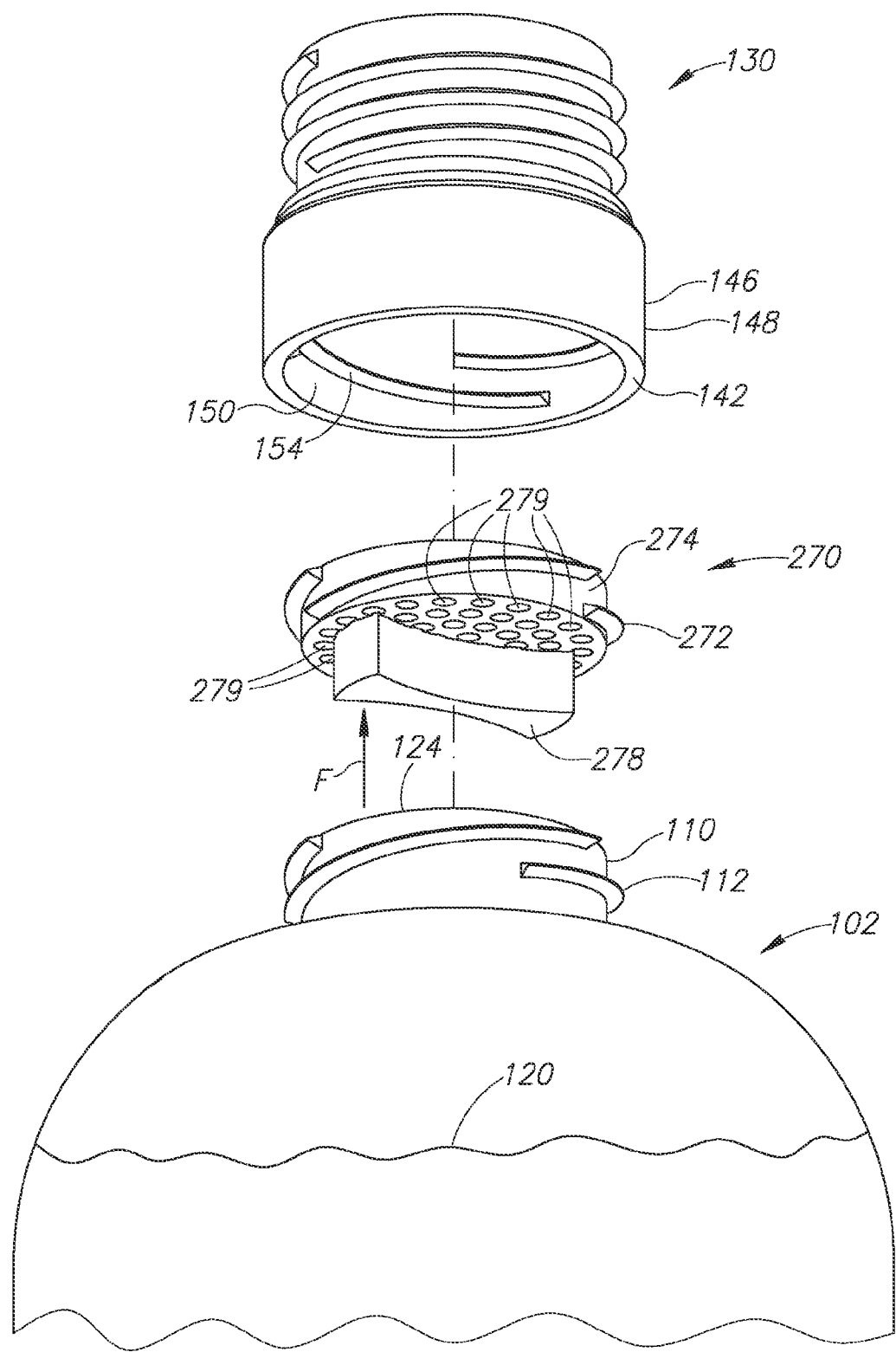
FIG. 5 is an exploded perspective view of an embodiment of the supplement dispensing closure of FIG. 3 including an optional threaded filter that threads into the supplement housing portion.

Turning to FIG. 5, the closure 100 (see FIG. 1) may include an optional threaded filter 270 having outside threads 272 disposed about its peripheral portion 274. The filter 270 may be receivable inside the open lower portion 150 of the first connector portion 146 of the supplement housing portion 130 and may threaded into the inside threads 154 disposed inside the lower portion 148 of the outer sidewall 142. The filter 270 may be threaded into the first connector portion 146 until it is adjacent to the perforated supplement support platform 180 (see FIG. 4). The filter 270 is prevented from exiting the hollow interior portion 152 through the open lower portion 150 by the threaded engagement of the outside threads 272 with the inside threads 154 of the supplement housing portion 130. In this embodiment, the optional filter retainer projection 262 may be omitted.

In the embodiment illustrated, the filter 270 includes a downwardly extending gripping projection 278. A user may grasp the gripping projection 278 to rotate the filter 270 to thread the outside threads 272 of the filter into the inside threads 154 of the supplement housing portion 130. After the filter 270 is threaded inside the first connector portion 146 of the supplement housing portion 130, the first connector portion 146 may be coupled to the outlet 124 of the container 102 by threading the outside threads 112 of the threaded neck portion 110 of the container 102 into the inside threads 154 of the supplement housing portion 130.

The filter 270 may include perforations 279. Alternatively, the filter 270 may be implemented as a charcoal filter, a foam filter or ceramic, a combination of these, and the like. Further, the filter 270 may be implemented as a screen or other type of filtering or screening device. For example, the filter 270 may be implemented as a charcoal water filter, a water distiller, a ceramic water filter, a reverse osmosis filter, an ultraviolet water filter, and the like. The filter 270 filters one or more components from the liquid 120 before it enters the supplement retention area 138. By way of a non-limiting example, the filter 270 may be coated with a coating (not shown) configured to filter one or more components from the liquid 120 before it enters the supplement retention area 138.

Figure 6:
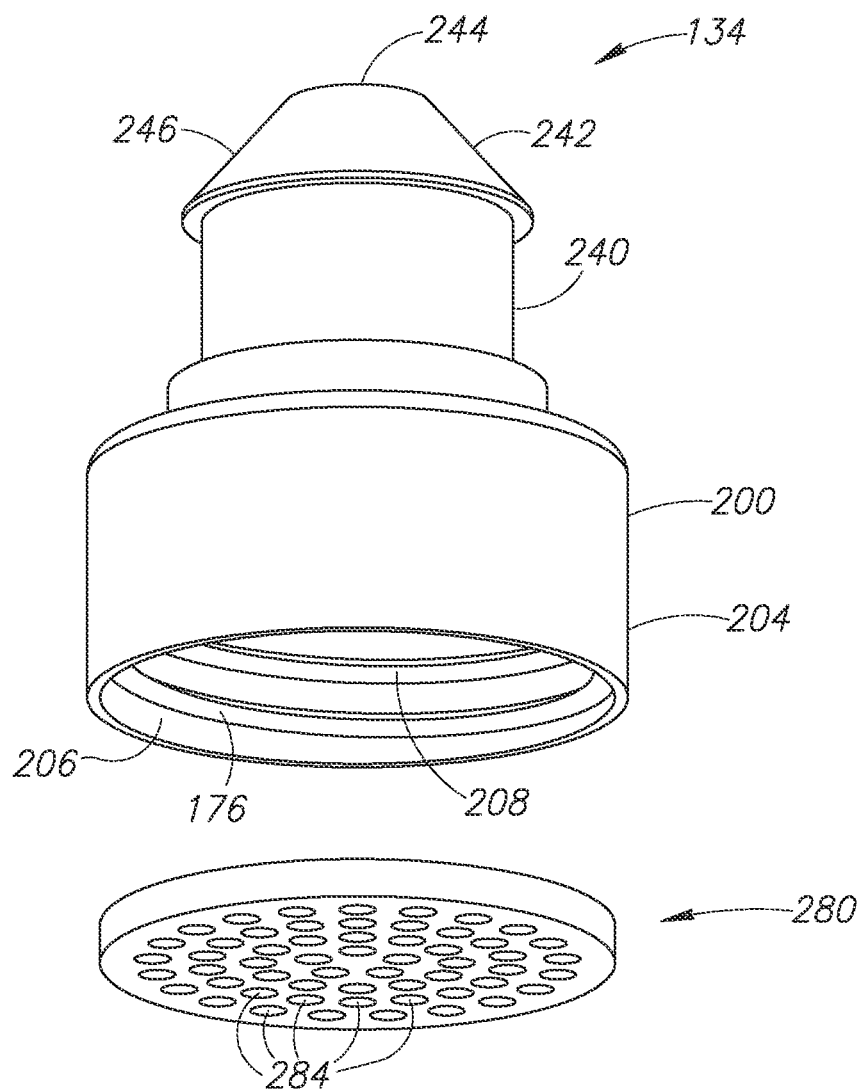
FIG. 6 is an exploded perspective view of an embodiment of the supplement dispensing closure of FIG. 3 including an optional filter that snaps into the cap portion.

Referring to FIG. 6, the closure 100 (see FIG. 1) may include an optional filter 280. The filter 280 may be receivable inside the open lower portion 206 of the cap connector portion 200 of the cap portion 134 and may optionally snap inside the hollow interior portion 208. Turning to FIG. 4, the hollow interior portion 208 may include at least one optional filter retainer projection 282 extending inwardly from the inside surface of the lower outer sidewall 204. The projection(s) 282 may be located between the inside threads 176 and the internal stop portion 220. The filter 280 may be pressed upwardly into the hollow interior portion 208 and forced passed the projection(s) 282 to removably secure it in place. Once located between the projection(s) 282 and the internal stop portion 220, the filter 280 is prevented from exiting the hollow interior portion 208 through the open lower portion 206 by the projection(s) 282.

Returning to FIG. 6, the filter 280 may include perforations 284. Alternatively, the filter 280 may be implemented as a charcoal filter, a foam or ceramic filter, a combination of these, and the like. Further, the filter 280 may be implemented as a screen or other type of filtering or screening device. For example, the filter 280 may be implemented as a charcoal water filter, a water distiller, a ceramic water filter, a reverse osmosis filter, an ultraviolet water filter, and the like. The filter 280 filters one or more components from the liquid 120 (see FIG. 3) after it leave the supplement retention area 138 (see FIG. 3). By way of a non-limiting example, the filter 280 may be coated with a coating (not shown) configured to filter one or more components from the liquid 120 (see FIG. 3) after it leave the supplement retention area 138 (see FIG. 3).

The shape and size of the first connector portion 146 may be determined at least in part by the type of container used to implement the container 102. Further, the shape and size of the second connector portion 160 may be determined at least in part by the type of cap or cap portion used. Therefore, the relative sizes of the first and second connector portions 146 and 160 depicted in the figures are for illustrative purposes and not are intended to be limiting. Further, while the supplement housing portion 130 and the cap portion 134 have been described as being separate components removably couplable together, through application of ordinary skill in the art to the present disclosure, embodiments may be constructed in which the supplement housing portion and the cap portion are a single or unitary component and such embodiments are within the scope of the present teachings.

Turning to FIG. 3, the supplement housing portion 130 may be included in a kit (not shown) along with at least one of the cap portion 134, the container 102, at least one of the dissolvable supplement bodies 140A, 140B, and 140C, the filter 260, the filter 270 (see FIG. 5), and the filter 280 (see FIG. 6). By way of a non-limiting example, a kit may include the supplement housing portion 130 and the cap portion 134.

By way of another non-limiting example, a kit may include the supplement housing portion 130 and the dissolvable supplement bodies 140A, 140B, and 140C. Such a kit may be used with any commercially available bottle and cap portion sold together (or separately), including prepackaged commercially available bottled beverages, such as bottled water. The dissolvable supplement bodies 140A, 140B, and 140C may be preassembled inside the supplement retention area 138 or may be separate from the supplement housing portion 130.

The closure 100 may be assembled by coupling the first connector portion 146 of the supplement housing portion 130 to the threaded neck portion 110 of the container 102. In embodiments including the filter 260, the filter 260 may be snapped inside the hollow interior portion 152 (see FIG. 4) of the first connector portion before it is coupled to the threaded neck portion 110 of the container 102. In embodiments including the filter 270, the outside threads 272 of the filter 270 may be threaded into the inside threads 154 of the first connector portion before it is coupled to the threaded neck portion 110 of the container 102.

Before or after the first connector portion is coupled to the threaded neck portion 110 of the container 102, the dissolvable supplement bodies 140A, 140B, and 140C are inserted inside the supplement retention area 138. Then, the cap connector portion 200 is coupled to the second connector portion 160 of the supplement housing portion 130. In embodiments including the filter 280, the filter 280 may be snapped inside the hollow interior portion 208 (see FIG. 6) of the cap connector portion 200 before it is coupled to the second connector portion 160 of the supplement housing portion 130.

After the closure 100 is assembled and coupled to the threaded neck portion 110 of the container 102, the liquid 120 may be poured from the container 102 (by tipping or inverting the container) through the closure 100 and passed the dissolvable supplement bodies 140A, 140B, and 140C therein to produce the supplemented liquid. Once outside the closure 100, the supplemented liquid may be consumed by a user.

Different dissolvable supplement bodies may be inserted into the supplement retention area 138 by uncoupling the cap connector portion 200 from the second connector portion 160 of the supplement housing portion 130 and inserting different dissolvable supplement bodies into the supplement retention area 138. Further, liquid (e.g., water) may be added to the container 102 by uncoupling the first connector portion 146 of the supplement housing portion 130 from the threaded neck portion 110 of the container 102 and pouring liquid into the container 102 through the outlet 124.

Figure 7:
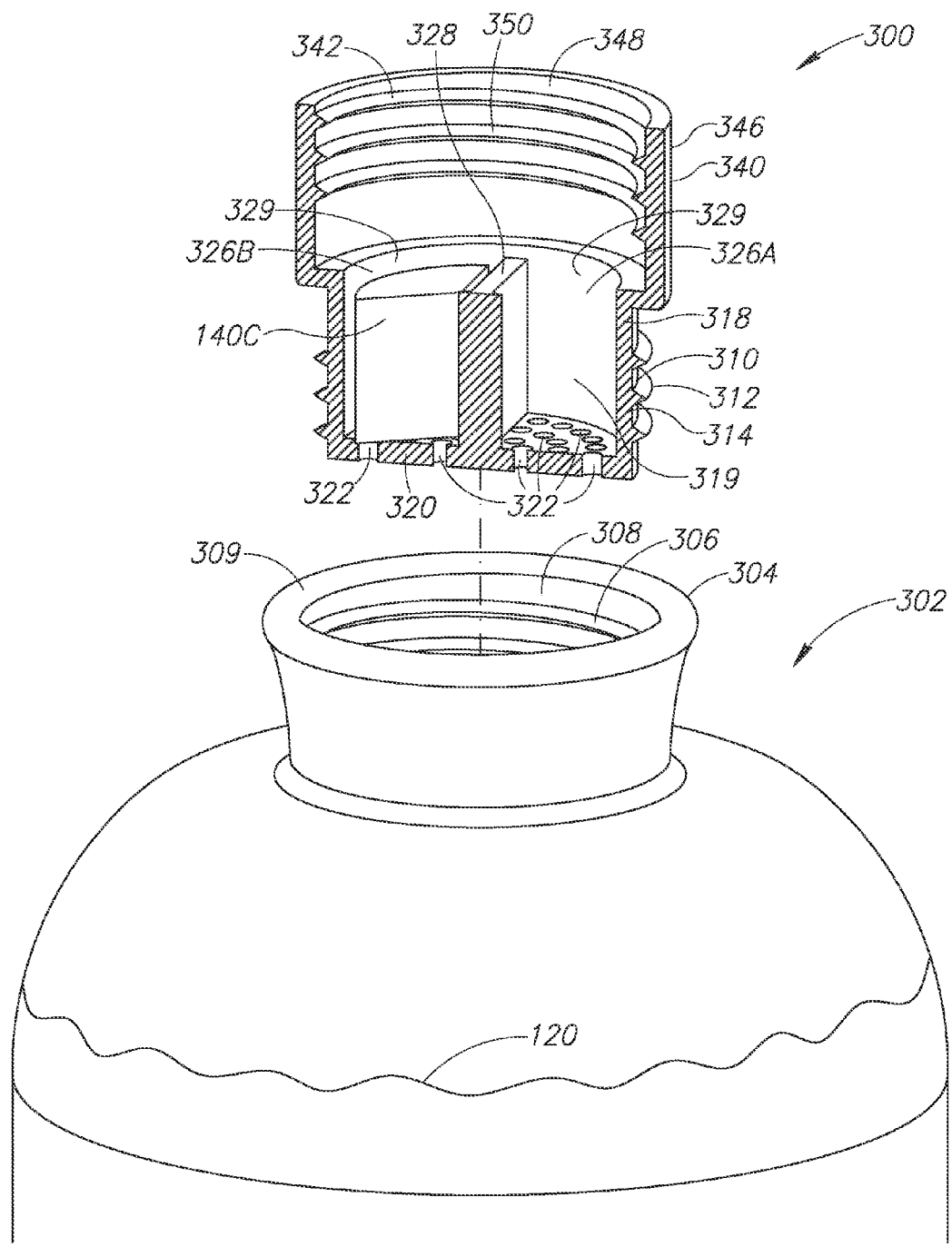
FIG. 7 is an exploded perspective view of an alternate embodiment of a supplement housing portion of a supplement dispensing closure for use with a container having a threaded neck portion with internal threads.

An alternate embodiment of the supplement housing portion 130 is illustrated in FIG. 7. FIG. 7 illustrates a supplement housing portion 300 configured for use with a bottle 302 having a threaded neck portion 304 with inside threads 306 disposed therein. The bottle 302 is illustrated housing the liquid 120. An outlet 308 is formed in an open distal portion 309 of the threaded neck portion 304.

By way of a non-limiting example, the bottle 302 may be implemented as a conventional SIGG bottle or container. A desirable feature of SIGG bottles is that they use the same diameter threaded neck portion (or head) and have the same inside threads disposed inside the threaded neck portion, which results in interchangeability of caps between different SIGG bottles.

The supplement housing portion 300 includes a first connector portion 310 having outside threads 312 configured to threadedly engage the inside threads 306 of the threaded neck portion 304 of the bottle 302. The first connector portion 310 is formed in a lower portion 314 of an outer sidewall 318, which defines a hollow interior portion 319. The hollow interior portion 319 is terminated along the lower portion 314 of the outer sidewall 318 by a perforated supplement support platform 320 substantially similar to the perforated supplement support platform 180 (described above and illustrated in FIG. 4). The perforated supplement support platform 320 has perforations 322 formed therein.

The lower portion 314 of the outer sidewall 318 is configured to be inserted inside the outlet 308 formed in the threaded neck portion 304 of the bottle 302 to position the perforated supplement support platform 320 inside the threaded neck portion 304 of the bottle 302. Once so inserted, the liquid 120 inside the bottle 302 may to be poured from the bottle 302 through the outlet 308 into the supplement housing portion 300 through the perforations 322 in the perforated supplement support platform 320.

The supplement housing portion 300 includes a supplement retention area 324 adjacent the perforated supplement support platform 320 that is substantially similar to the supplement retention area 138 (illustrated in FIG. 4 and described above). In the embodiment illustrated, the supplement retention area 324 is located at least partially inside the hollow interior portion 319 of the first connector portion 310.

Like the supplement retention area 138 (see FIG. 4), the supplement retention area 324 may optionally be divided into a plurality of supplement chambers (e.g., supplement chambers 326A, and 326B) by one or more dividing walls (e.g., dividing wall 328). For example, the supplement housing portion 300 may include three supplement chambers substantially similar to the supplement chambers 190A, 190B, and 190C (see FIG. 3) separated by three dividing walls substantially similar to the dividing walls 192A, 192B, and 192C (see FIG. 3).

Each of the supplement chambers (e.g., supplement chambers 326A, and 326B) have an open top portion 329 configured to receive a dissolvable supplement body (e.g., the dissolvable supplement body 140C) inside the supplement chamber. As the liquid 120 flows through the supplement chambers, the dissolvable supplement bodies are dissolved by the liquid and combine therewith to form a supplemented liquid, which flows out of the supplement chambers through their open top portions 329.

The supplement housing portion 300 includes a second connector portion 340 having inside threads 342 configured to threadedly engage outside threads (not shown) of a cap portion (not shown). The second connector portion 340 is formed in an upper portion 346 of the outer sidewall 318, which defines an open upper portion 348 in communication with a hollow interior portion 350.

The cap portion (not shown) may be implemented as any cap receivable inside the hollow interior portion 350 through the open upper portion 348 and having outside threads configured to engage the inside threads 342 of the second connector portion 340. In embodiments in which the bottle 302 is implemented as a SIGG bottle, the cap portion may be implemented as any cap suitable for use with a SIGG bottle. For example, suitable caps couplable to the second connector portion 340 may be obtained from MySIGG.com of Stamford, Conn., which operates a website at www.mysigg.com. Non-limiting examples of suitable caps available from MySIGG.com include the SIGG Sports Top, Active Bottle Top, and Kids Bottle Top. Thus, the cap portion may be selectively couplable to either the second connector portion 340 or the threaded neck portion 304 of the bottle 302. However, this is not a requirement.

The supplemented liquid flows out of the supplement chambers (e.g., supplement chambers 326A, and 326B) through their open top portions 329 and into the cap portion (not shown). The cap portion includes an exit aperture (not shown) through which the supplemented liquid may exit the cap portion to be consumed by the user. A lower portion of the cap portion (not shown) functions as the internal stop portion 220 (see FIG. 4), retaining the dissolvable supplement bodies 140A, 140B, and 140C (see FIG. 3) inside the supplement retention area 324 as the liquid 120 flows passed and dissolves them.

Unlike prior art supplemented beverages (such as sports drinks, energy drinks, dietary drinks, wellness drinks, etc.) which include a premixed selection of supplements, the supplemented liquid created using the supplement housing portions 130 and 300 may be created from a custom selected set of dissolvable supplement bodies 140A, 140B, and 140C selected by the user. In other words, the supplement housing portions 130 and 300 allow the user to customize their selection of dissolvable supplement bodies 140A, 140B, and 140C to create a custom supplemented liquid for their individual use. The dissolvable supplement bodies 140A, 140B, and 140C may be selected based on a user's individual needs or desires. The dissolvable supplement bodies 140A, 140B, and 140C may be configured to have the same or complementary flavors so that any supplement body may be used with any other supplement body without producing an undesirable flavor combination.

The dry solid dissolvable supplement bodies 140A, 140B, and 140C reside in the supplement retention area 138 (or the supplement retention area 324), which are spaced apart from the liquid 120 stored inside the container 102 (or the bottle 302). Thus, when the user is not pouring the liquid 120 from the container 102 (or the bottle 302), the dissolvable supplement bodies remain dry, which helps the supplements retain their effectiveness. As is appreciated by those of ordinary skill in the art, vitamins and other healthful ingredients deteriorate when dissolved or immersed in water or other liquids. In particular, Vitamin C loses about 80% of its potency after only thirty days of expose to water. Thus, many nutrients, including vitamins lose their effectiveness if stored in water or other liquids for too long. The supplement housing portions 130 and 300 help avoid a loss of effectiveness of such nutrients by spacing the dissolvable supplement bodies 140A, 140B, and 140C from the liquid 120 when they are not being dissolved to create the supplemented liquid. Further, because the supplemented liquid may be consumed immediately after it is created, the vitamins, nutrients, and other healthful ingredients do not have time to deteriorate as a result of their exposure to the liquid 120 such as during shipment or storage, or while being carried during periods of non-use by a user.

Because the dissolvable supplement bodies 140A, 140B, and 140C each dissolve at a dissolve rate as the liquid 120 flows passed them, the amount of supplement introduced into the liquid 120 is controlled or limited by this dissolve rate. Thus, the user consumes a dosage of the supplements based upon the amount of liquid consumed. Further, a total amount of supplemented liquid created is based upon the amount of liquid 120 poured from the container 102 through the supplement housing portions 130 and 300. If a user chooses to drink less than the entire amount of liquid 120 stored in the container 102, only a corresponding portion of the dissolvable supplement bodies 140A, 140B, and 140C will be dissolved by the liquid 120 as it is poured from the container 102. In this manner, the supplement housing portions 130 and 300 provide a uniform dosage of supplements in the liquid 120, no matter how much is consumed by the user and when it is consumed.

Many supplements (including vitamins) are toxic if consumed in too large of a quantity (i.e., an overdose). By sizing each of the supplement chambers 190A, 190B, and 190C to accept only a single dissolvable supplement body 140A, 140B, and 140C, respectively, the supplement housing portions 130 and 300 may help prevent a user from consuming too much of any one supplement. In contrast, simply dissolving supplements in a liquid or swallowing supplement tablets or capsules can results in an inadvertent overdose.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A supplement dispensing closure couplable to an outlet of a container housing a liquid, the closure comprising:
   a supplement retention portion and a liquid flow pathway extending through the supplement retention portion, the liquid flow pathway being configured to guide a liquid exiting the container through the outlet through the supplement retention portion when the closure is coupled to the container, the supplement retention portion comprising an open upper portion and a perforated supplement support platform that are together configured to retain a dissolvable supplement body as the liquid flows through the supplement retention portion and dissolves the dissolvable supplement body, and an open lower portion including a filter retainer projection, the open lower portion comprising a first connector portion and the open upper portion comprising a second connector portion, the first connector portion being couplable to the outlet of the container;
   a cap portion selectively couplable to and removable from the second connector portion, the cap portion including an open lower portion;
   a first filter selectively attachable to the supplement retention portion by pressing the first filter upward into the open lower portion and forcing the first filter onto the filter retainer projection; and
   a second filter receivable inside the open lower portion of the cap portion.

2. The supplement dispensing closure of claim 1, wherein the first filter comprises a screen filter.

3. The supplement dispensing closure of claim 1, wherein the
   second filter is disposed within a portion of the liquid flow pathway downstream from the supplement retention portion, the second filter being operable to filter a liquid with a dissolved portion of the dissolvable supplement body dissolved therein after the liquid has flowed through the supplement retention portion.

4. The supplement dispensing closure of claim 1, wherein the supplement retention portion comprises:
   a supplement stop portion disposed downstream from the open upper portion of the supplement retention portion configured to retain the dissolvable supplement body in the supplement retention portion, the supplement stop portion including an exit aperture positioned such that a liquid dissolving the dissolvable supplement body flows through the supplement retention portion and out the exit aperture of the supplement stop portion.

5. The supplement dispensing closure of claim 4, wherein the second filter is located adjacent to the exit aperture of the supplement stop portion.

6. The supplement dispensing closure of claim 4, wherein the supplement stop portion is located wherein the cap portion.

7. The supplement dispensing closure of claim 1, wherein the filter retainer projection comprises a circumferential projection disposed on an inner wall of the open lower portion.

8. A kit comprising:
an open ended supplement housing having a first open end, a second open end, a first connector portion at the first open end couplable to an outlet portion of a container, a second connector portion at the second open end, and at least one supplement chamber positioned between the first and second open ends, the first open end comprising a filter retainer projection;
a first filter selectively attachable to the filter retainer projection;
a cap having a connector portion couplable to the second connector portion at the second open end of the supplement housing, the cap being configured to retain a dissolvable supplement body inside the at least one supplement chamber as the dissolvable supplement body dissolves in a liquid flowing from the outlet portion of the container into the first open end of the supplement housing through the at least one supplement chamber and out the second open end of the supplement housing, the cap including an open lower portion; and
a second filter receivable inside the open lower portion of the cap.

9. The kit of claim 8, further comprising a container having an outlet portion couplable to the first connector portion of the supplement housing.

10. The kit of claim 8, wherein the first filter is selectively attachable to the filter retainer projection by pressing the first filter upward into the first open end and forcing the first filter onto the filter retainer projection.

11. A kit comprising:
an open ended threaded supplement housing threadably attachable to a threaded outlet portion of a container, the supplement housing including at least one supplement chamber disposed between the open ends of the supplement housing configured to retain a dissolvable supplement body as it dissolves in a liquid poured from the threaded outlet portion of the container into one of the open ends of the supplement housing through the at least one supplement chamber and out the other of the open ends of the supplement housing, the supplement housing further including a filter retainer projection;
a cap portion selectively couplable to and removable from the supplement housing, the cap portion including an open lower portion;
a first filter selectively attachable to the filter retainer projection;
a second filter receivable inside the open lower portion of the cap portion; and
at least one dissolvable supplement body.

12. The kit of claim 11, wherein the first filter is selectively attachable to the filter retainer projection by forcing the first filter onto the filter retainer projection.

13. A supplement dispensing closure couplable to an outlet of a container housing a liquid, the closure comprising:
a supplement retention portion and a liquid flow pathway extending through the supplement retention portion, the liquid flow pathway being configured to guide a liquid exiting the container through the outlet through the supplement retention portion when the closure is coupled to the container, the supplement retention portion comprising an open upper portion and a perforated supplement support platform that are together configured to retain a dissolvable supplement body as the liquid flows through the supplement retention portion and dissolves the dissolvable supplement body, the supplement retention portion also comprising a plurality of elongated raised portions extending upwardly from the perforated supplement support platform configured to at least partially separate two or more dissolvable supplement bodies as a liquid flows through the supplement retention area and dissolves the separated dissolvable supplement bodies, and an open lower portion including a filter retainer projection; and
a first filter selectively attachable to the supplement retention portion by pressing the first filter upward into the open lower portion and forcing the first filter onto the filter retainer projection.

14. The supplement dispensing closure of claim 13, wherein the plurality of elongated raised portions comprises three raised portions extending upwardly from the perforated supplement support platform, each raised portion having a first end adjacent an inner wall of the open upper portion and a second end adjacent the second end of the other two raised portions.

15. The supplement dispensing closure of claim 13, wherein the plurality of elongated raised portions extend upwardly from the perforated supplement platform to a height that is less than the height of the open upper portion.

16. A supplement dispensing closure couplable to an outlet of a container housing a liquid, the closure comprising:
a supplement retention chamber and a liquid flow pathway extending through the supplement retention chamber, the liquid flow pathway being configured to guide a liquid exiting the container through the outlet through the supplement retention chamber when the closure is coupled to the container, the supplement retention chamber being configured to retain a dissolvable supplement body as the liquid flows therethrough and dissolves the dissolvable supplement body;
a cap portion selectively couplable to and removable from the supplement retension chamber, the cap portion including an open lower portion;
a selectively removable first filter disposed within a portion of the liquid flow pathway before the supplement retention chamber, the first filter being operable to filter a liquid guided by the liquid flow pathway before the liquid flows through the supplement retention chamber; and
a second filter positioned inside the open lower portion of the cap portion.

17. The supplement dispensing closure of claim 16, wherein the first filter is a filter assembly comprising a single molded piece.

* * * * *